United States Patent

Martin

[15] 3,656,649
[45] Apr. 18, 1972

[54] DELICATE INSTRUMENT SHIPPING CRATE

[72] Inventor: Louis N. Martin, Route 1, P.O. Box 406B, Brandywine, Md. 20613

[22] Filed: July 20, 1970

[21] Appl. No.: 56,523

[52] U.S. Cl. ..............................217/52, 206/46 M, 248/184
[51] Int. Cl. ...................................B65d 25/12, B65d 85/30
[58] Field of Search.............217/52, 53, 54; 206/46 M, 4 FF; 248/184, 284, 138

[56] References Cited

UNITED STATES PATENTS

| 2,605,072 | 7/1952 | Klein et al..............................248/184 |
| 163,838 | 6/1975 | Baker......................................248/184 |
| 2,928,535 | 3/1960 | Simmons et al. .....................206/46 M |

FOREIGN PATENTS OR APPLICATIONS

| 277,370 | 9/1926 | Great Britain..........................217/52 |
| 946,274 | 7/1956 | Germany ............................206/46 FR |

Primary Examiner—Raphael H. Schwartz
Attorney—R. S. Sciascia, Arthur L. Branning, James G. Murray and John M. Neary

[57] ABSTRACT

A shipping crate for delicate instruments including a wooden crate inside of which a frame is gimbal mounted. The delicate instrument is strapped to the frame with its center of gravity disposed below the frame plane. The gimbal mounting of the frame maintains the instrument case in a generally vertical attitude regardless of the orientation of the crate during transit, and shocks delivered to the crate are converted to kinetic energy by the swinging of the case in the gimbal mount thereby mitigating the shock and protecting the delicate instrument.

4 Claims, 3 Drawing Figures

INVENTOR
LOUIS N. MARTIN
BY
ATTORNEYS

DELICATE INSTRUMENT SHIPPING CRATE

BACKGROUND OF THE DISCLOSURE

This invention relates generally to shipping crates for delicate instruments and more particularly to shipping crates for deep sea reversing thermometers.

The various oceanographic institutions in this country have recently been inconvenienced by a regulation of the Federal Aviation Administration which restricts carry-on packages on airlines to those that fit under the occupant's seat. Previous to this it was common practice for oceanographers bound for the field to carry the deep sea reversing thermometers in a carrying case on their laps. The regulation however, prohibited this practice and required the oceanographic institutions to purchase half fare seats for reversing thermometers in a carrying case or for the case of thermometers to be stored in the freight compartment of the airplane. The first alternative was prohibitively expensive and the second alternative resulted in an incidence of damage to the delicate reversing thermometers of more than 70 percent. The reversing thermometers are so delicate that they are easily fractured and inverting of the thermometer causes separation of the mercury column and a shift in the calibration of the thermometer.

Various shipping crates having vibration absorbing material and apparatus were attempted for transporting the reversing thermometers, but none were successful in insulating the delicate thermometers from damaging shock and preventing their inversion during transit. Moreover these prior art shipping crates were often extremely expensive and included such complicated shock mitigating mechanism that the case was always far heavier than was reasonably acceptable. Finally, these prior art shipping cases often proved short lived in that the shock mitigating mechanism would wear out or become broken after only a few trips.

Therefore there has long been a need in the art for a strong, lightweight shipping container or crate having the capability of maintaining the upright orientation of the contents thereof and providing excellent shock mitigation characteristics.

SUMMARY OF THE INVENTION

Accordingly, one object of the present invention is to provide a shipping crate for delicate instruments which maintains a continuous upright orientation of the contents of the crate.

Another object of the present invention is to provide a shipping crate for delicate instruments having excellent shock mitigation characteristics.

Yet a further object of the present invention is to provide a shipping crate for delicate instruments which is inexpensive to manufacture and of simple, uncomplicated construction.

Another object of the present invention is to provide a shipping crate for delicate instruments which is rugged and long lasting and capable of withstanding many years of rigorous use.

These and other objects are attained by providing a shipping crate having a heavy wooden box centrally within which is mounted a gimbaled frame for holding the delicate instrument carrying case. The gimbaled frame maintains the upright orientation of the instrument carrying case and also acts as a floating platform for smoothly absorbing shock.

DESCRIPTION OF THE DRAWINGS

A more complete appreciation of the invention and its many attendant advantages will develop as the same becomes better understood by reference to the following detailed description when considered in connection with the accompanying drawings wherein.

DESCRIPTION OF THE PREFERRED EMBODIMENT

Figure 1:
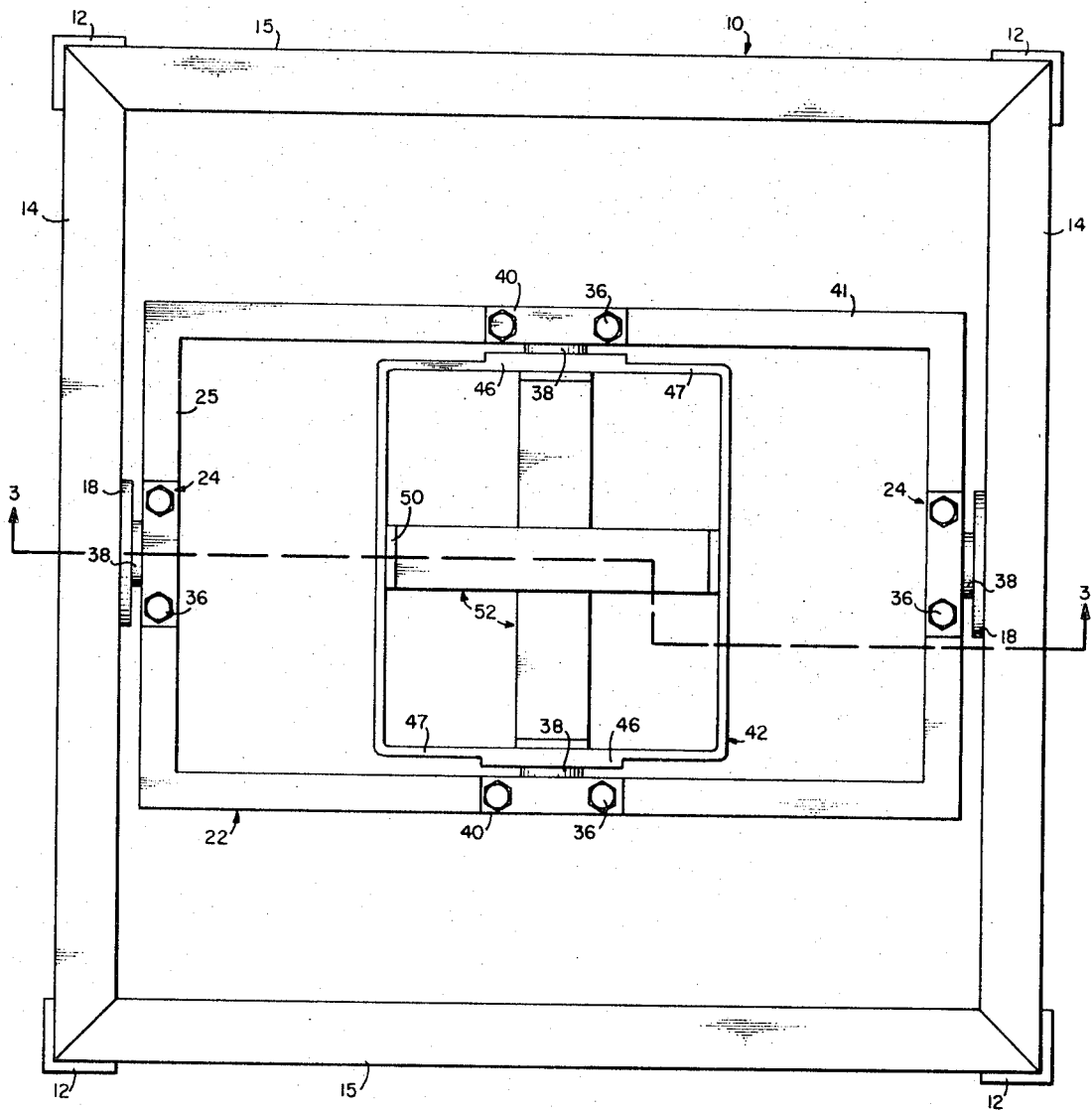
FIG. 1 is a plan view of a shipping crate according to the present invention with the top open.
Figure 2:
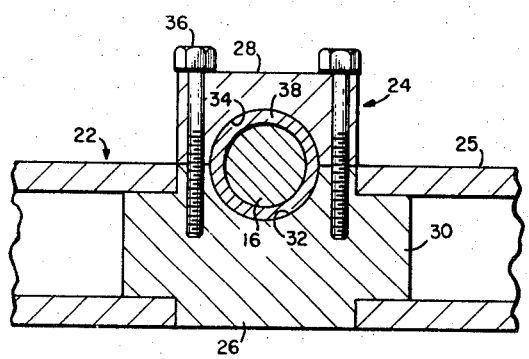
FIG. 2 is an elevation, partly in section, along lines 2—2 in FIG. 1.

Referring now to the drawings wherein like reference characters designate identical or corresponding parts throughout the several views and more particularly to FIG. 1 which shows a plan view of the shipping crate having a heavy wooden rectangular box 10 of ¾ inch plywood, the exterior corners of which are reinforced by angle irons 12 running the entire depth of the box. A wooden lid (not shown) is hinged to the box and conventional latches are supplied for fastening the lid in closed position. Mounted on opposite sides 14 of box 12 are a pair of pivot pins 16 welded to mounting plates 18 fastened, in turn, to sides 14 by screws (not shown). A rectangular frame 22 formed of hollow rectangular steel tubing is journaled for rotation within box 10 by means of steel bearing blocks 24 secured to the middle of opposite sides 25 of frame 22, as best seen in FIG. 2. A second set of bearing blocks 40, identical to bearing blocks 24, are secured to the mid portions of the other two sides 41 of frame 22, for a purpose which will appear presently. Bearing blocks 24 and 40 include a junction bar 26 and a cap piece 28. Junction bar 26 has formed on opposite sides thereof a pair of studs 30 which fit snugly within the hollow core of the rectangular tubing of frame 22. Junction bars 26 are welded at their abutting edges with the rectangular tubing thereby joining the rectangular tubing into an integral unit. Thus it is seen that frame 22 is formed of four identical L-shaped pieces of hollow rectangular steel tubing joined together in a rectangle by means of the four identical junction bars 26.

Junction bar 26 has formed in the top surface thereof semicylindrical hollow 32 and cap 28 has formed in the bottom surface thereof a similar hollow 34; semicylindrical hollows 32 and 34 together define a cylindrical bore through bearing block 24 when cap 28 is secured to junction bar 26 by a pair of machine screws 36. A bearing bushing 38 fits within the bore formed by hollows 32 and 34 and is clamped therein by an interference fit in said bore. Bearing bushing 38 receives pivot pins 16 at each end of frame 22 thereby providing for free rotation of frame 22 about the axis through pivot pins 16.

An inner rectangular frame 42 having sides parallel to the sides of frame 22 and box 10 is journaled in bearing blocks 40 by means of pivot pins 44 secured to mounting plates 46 in turn welded to the outside surface of opposite sides 47 of inner frame 42 at the longitudinal mid point thereof. The journaling of frame 22 about the axis through pivot pins 16 and the journaling of frame 42 in frame 22 about the axis through pivot pins 44 orthogonal to and intersecting the axis through pins 16 completes the gimbaling of frame within box 10.

Figure 3:
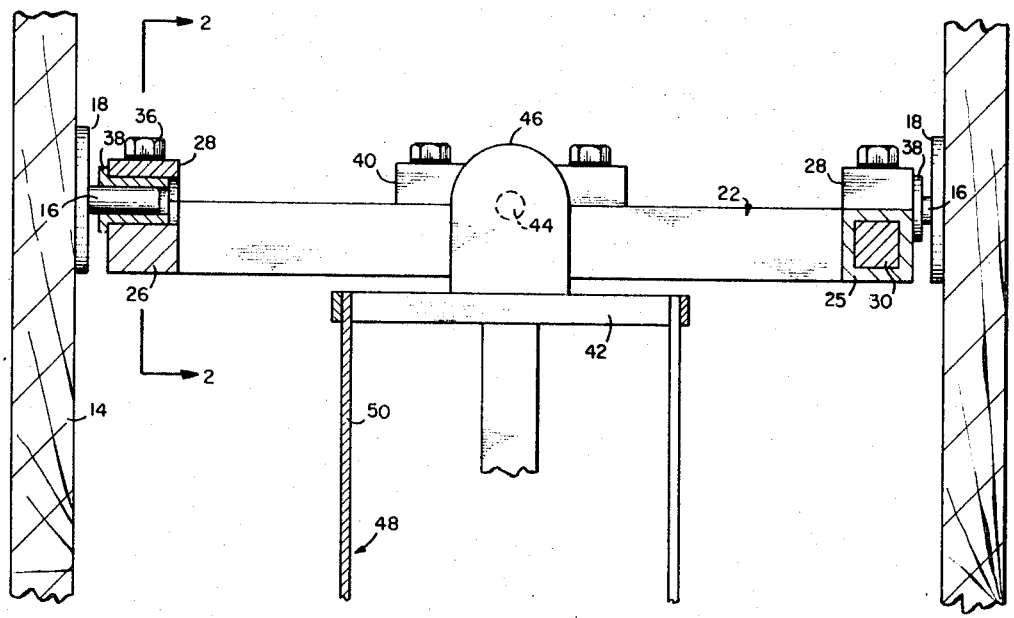
FIG. 3 is an elevation, partly in section, along line 3—3 in FIG. 1.

Looking now at FIGS. 2 and 3, depending from frame 42 is a supporting basket 48 formed of depending support members 50 joined by horizontal bottom straps 52. The depth of basket 58 is less than the distance between the axis through pins 16 and side walls 15 of box 10 to permit basket 48 to swivel freely without colliding with walls 15 and similarly is less than the distance between the axis through pins 44 and sides 25 of frame 22 for the same purpose. The delicate instrument to be shipped is inserted in its carrying case into basket 48 and secured therein by one or more elastic straps which are fastened to hooks (not shown) secured to frame 42. The lid of box 10 is then closed and latched and the crate is ready for shipment.

The center of gravity of the carrying case is well below both axes of rotation. Thus, when the center of gravity is displaced from the vertical line through the intersection of the axes of rotation through pins 16 and 44, as occurs when the crate is tipped, a moment will be exerted on basket 48 and its contents to tend to restore the center of gravity thereof to said vertical line. Thus, when the crate is tipped over and falls on its side, as frequently occurs during the usual rough treatment accorded freight in transit the gimbaled frame swivels so as to maintain the upright orientation of the delicate instrument contained in the basket 48. When the crate is dropped, the basket 48 with the delicate instrument contained therein swivels smoothly in its journals thereby converting the shock to smooth kinetic energy in the basket and the contents. The energy is dissipated gradually by the oscillations of the basket and the instrument is saved from damaging shock.

Obviously, numerous variations and modifications of the above described preferred embodiment or best mode are possible in light of the above teachings. It is therefore contemplated that within the scope of the appended claims the invention may be practiced otherwise than as specifically described herein.

What is claimed and desired to be secured by letters patent of the United States is:

1. A shipping crate for transporting delicate instruments, comprising:
    a container;
    a first frame;
    first journaling means for journaling said first frame in opposite sides of said container for rotation about a first axis;
    a second frame;
    second journaling means for journaling said second frame in said first frame on opposite sides thereof for rotation about a second axis non-parallel with said first axis;
    means carried by said second frame for supporting said delicate instrument with the center of gravity thereof displaced from both axes of rotation;
    said container is a rectangular box having parallel opposite sides;
    said first and second frames are rectangular having sides parallel to respective sides of said box;
    said axes of rotation are parallel to respective opposite sides of said box and said frames;
    the depth of said supporting means is less than the perpendicular distance between said first axis and the interior walls of said box parallel with said first axis, and is less than the perpendicular distance between said second axis and the sides of said first frame parallel therewith.

2. The shipping crate defined in claim 1, wherein:
    said first axis and said second axis are perpendicular to and intersect each other.

3. A shipping crate for transporting delicate instruments, comprising:
    a container;
    a first frame;
    first journaling means for journaling said first frame in opposite sides of said container for rotation about a first axis;
    a second frame;
    second journaling means for journaling said second frame in said first frame on opposite sides thereof for rotation about a second axis non-parallel with said first axis;
    means carried by said second frame for supporting said delicate instrument with the center of gravity thereof displaced from both said axes of rotation;
    said first frame comprising four pieces of hollow steel tubing;
    said first and second journaling means comprise two sets of two bearing blocks secured midway along opposite sides of said first frame by means of side studs formed on said bearing blocks which fit snuggly into the hollow core of said hollow tubing and join said four pieces of tubing into an integral frame;
    said first journaling means additionally comprises a first pair of pivot pins fastened to opposite sides of said container and extending into one of said sets of bearing blocks for rotatably supporting said first frame; and
    said second journaling means additionally comprises a second pair of pivot pins fastened to said second frame for rotatably supporting said second frame within said first frame.

4. The shipping crate defined in claim 3, wherein:
    said container is a rectangular box having parallel opposite sides;
    said first and second frames are rectangular having sides parallel to respective sides of said box;
    said axes of rotation are parallel to respective opposite sides of said box and said frames;
    the depth of said supporting means is less than the perpendicular distance between said first axis and the interior walls of said box parallel with said first axis, and is less than the perpendicular distance between said second axis and the sides of said first frame parallel therewith.

* * * * *